(12) United States Patent
Lin et al.

(10) Patent No.: US 10,070,398 B2
(45) Date of Patent: Sep. 4, 2018

(54) RADIO POWER MODE SWITCHING

(71) Applicant: HEWLETT-PACKARD DEVELOPMENT COMPANY, L.P., Houston, TX (US)

(72) Inventors: I-Chen Lin, Taipei (TW); Han-Kuang Chang, Taipei (TW); Leo Joseph Gerten, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/563,222

(22) PCT Filed: Jul. 28, 2015

(86) PCT No.: PCT/US2015/042410
§ 371 (c)(1),
(2) Date: Sep. 29, 2017

(87) PCT Pub. No.: WO2017/019029
PCT Pub. Date: Feb. 2, 2017

(65) Prior Publication Data
US 2018/0132194 A1    May 10, 2018

(51) Int. Cl.
*H01Q 11/12*    (2006.01)
*H04B 1/04*    (2006.01)
*H04W 52/28*    (2009.01)
*H04W 52/02*    (2009.01)
*H04W 36/32*    (2009.01)
*H04W 52/24*    (2009.01)
*H04W 52/38*    (2009.01)
*H04W 88/06*    (2009.01)

(52) U.S. Cl.
CPC ......... *H04W 52/283* (2013.01); *H04W 36/32* (2013.01); *H04W 52/0216* (2013.01); *H04W 52/245* (2013.01); *H04W 52/38* (2013.01); *H04W 88/06* (2013.01); *H04W 52/0251* (2013.01); *Y02D 70/142* (2018.01); *Y02D 70/164* (2018.01)

(58) Field of Classification Search
CPC .............. H04W 52/283; H04W 36/32; H04W 52/0216; H04W 52/245; H04W 52/38; H04W 88/06; Y02D 70/142; Y02D 70/164
See application file for complete search history.

(56) References Cited

U.S. PATENT DOCUMENTS 7,466,678 B2    12/2008 Cromer et al.
8,285,883 B2    10/2012 Bishop
8,433,312 B2    4/2013 Salomone et al.
(Continued)

OTHER PUBLICATIONS

"Wi-Fi Network Setup," Cisco DX Series Administration Guide, Release 10.2(2), Sep. 21, 2014, pp. 1-5.

*Primary Examiner* — Nhan Le
(74) *Attorney, Agent, or Firm* — Brooks, Cameron & Huebsch

(57) ABSTRACT

In one implementation, radio power mode switching includes comparing a time zone associated with a current location of a client device with a country code associated with a current location of an access point, where the client device is connected to the access point, and switching a first radio power mode of the client device to a second radio power mode of the client device based on the comparison of the time zone and the country code.

12 Claims, 2 Drawing Sheets

(56) References Cited

U.S. PATENT DOCUMENTS

| | | |
|---|---|---|
| 2008/0259882 A1 | 10/2008 | Abdel-Kader et al. |
| 2011/0045789 A1 | 2/2011 | Sinton et al. |
| 2011/0250902 A1 | 10/2011 | Huang et al. |
| 2012/0225664 A1* | 9/2012 | Baudino ............... G04R 20/18 455/456.1 |
| 2013/0028245 A1 | 1/2013 | Oerton et al. |
| 2014/0323108 A1* | 10/2014 | Doubek .............. H04W 52/283 455/418 |

* cited by examiner

RADIO POWER MODE SWITCHING

BACKGROUND

Under the Institute of Electrical and Electronics Engineers (IEEE) 802.11 specifications for implementing wireless local area network (WLAN) communications, there exist a number of distinct frequency ranges. Each distinct frequency range is divided into a multitude of channels. Individual countries apply their own regulations in regulating the use of these WLAN channels.

Devices using regulated WLAN channels may be sold in one country with specified WLAN channel regulations and later, carried by the stream of commerce, resold in a country with different WLAN channel regulations. It may be difficult to manufacture and market devices that comply with WLAN channel regulations on a global basis due to the global movement of devices.

DETAILED DESCRIPTION

Figure 1:
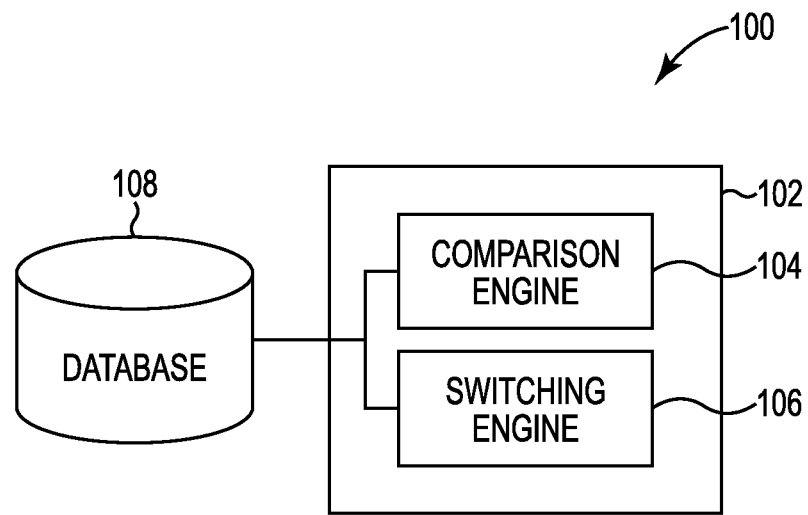
FIG. 1 illustrates a diagram of an example of a system suitable to perform radio power mode switching consistent with the disclosure.

A number of methods, systems, and computer readable medium to perform radio power mode switching of a client device are described herein. Commerce on a global scale has created the desire for client devices utilizing wireless technology such as wireless local area network (WLAN) technology to comply with many different regulations and/or regulated power output values imposed by countries where client devices are being sold. That is, a regulated power output value governing operation of a client device can vary depending upon the client devices particular location (e.g., which country a client device is located in). In particular, client devices in use in the United States that utilize the Institute of Electrical and Electronics Engineers (IEEE) 802.11d protocols operating on Channel 12 or Channel 13 of the 2.4 gigahertz (GHz) frequency band are subject to regulation of the power output (i.e., power output values) of the client device, as described herein. As a result, client device manufacturers can comply with varying WLAN regulations governing the power output of a client device by adjusting the power output of the client device based on a location of the client device.

As used herein, radio power mode switching can refer to comparing a time zone associated with a current location of a client device with a country code associated with a current location of an access point, where the client device is connected to the access point, and switching a first radio power mode of the client device to a second radio power mode of the client device based on the comparison of the time zone and the country code. As used herein, a client device may include a notebook, tablet, mobile phone, and/or other mobile device that can utilize a WLAN connection.

As used herein, an access point can refer to a device with a range of communication access that can allow a client device to connect to a wired network through the access point while the location of the client device is within the range of communication access of the access point. The connection of the client device to the access point can be by Wi-Fi, or any other wireless communication standard using IEEE 802.11d protocols. For example, a client device within the range of communication access of an access point, can connect to a wired network by wirelessly connecting (e.g., via a WLAN) to the access point associated with the wired network.

As used herein, a country code can refer to a code which indicates the country in which the access point is located. For example, an access point located within the United States can broadcast a country code indicating the access point is located within the United States. As another example, an access point located within Spain can broadcast a country code indicating the access point is broadcasting within Spain. By receiving a country code, a client device can compare a time zone associated with a current location of the client device with the country code of the access point and can switch a radio power mode of the client device, as will be further described herein.

Figure 2:
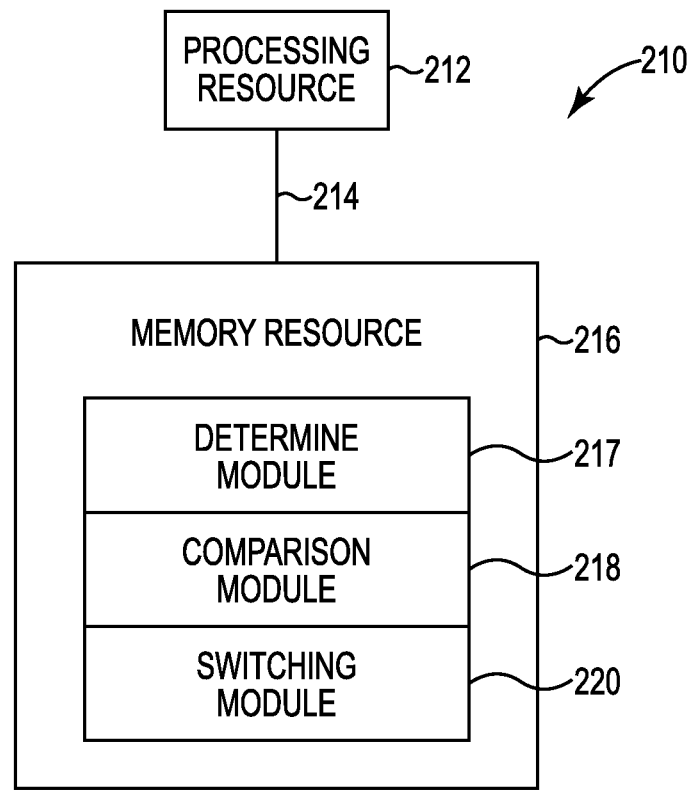
FIG. 2 illustrates a diagram of an example computing device consistent with the disclosure.

FIGS. 1 and 2 illustrate examples of system 100 and computing device 210 consistent with the present disclosure. FIG. 1 illustrates a diagram of an example of a system 100 suitable to perform radio power mode switching consistent with the present disclosure. The system 100 can include a database 108, a radio power control of a client device system 102, and/or a number of engines (e.g., comparison engine 104, switch engine 106). The radio power control of a client device system 102 can be in communication with the database 108 via a communication link, and can include the number of engines (e.g., comparison engine 104, switch engine 106). The radio power control of a client device system 102 can include additional or fewer engines that are illustrated to perform the various elements as will be described in further detail in connection with FIG. 3.

The number of engines (e.g., comparison engine 104, switch engine 106) can include a combination of hardware and machine readable instructions (e.g., stored in a memory resource such as a non-transitory machine readable medium) that are executable using hardware components such as a processor, but at least hardware, to perform elements described herein (e.g., compare a time zone associated with a current location of a client device with a country code associated with a current location of an access point, wherein the client device is connected to the access point, switch a first radio power mode of the client device to a second radio power mode of the client device based on the comparison of the time zone and the country code, etc.).

The comparison engine 104 can include hardware and/or a combination of hardware and machine readable instructions, but at least hardware, to compare a time zone associated with a current location of a client device with a country code associated with a current location of an access point, wherein the client device is connected to the access point. As used herein, a country code can indicate a country in which an access point is broadcasting, as will be further described herein.

The switch engine 106 can include hardware and/or a combination of hardware and machine readable instructions, but at least hardware, to switch a first radio power mode of the client device to a second radio power mode of the client device based on the comparison of the time zone and the country code. For example, the switch engine can utilize the time zone of the client device and the country code received from the access point to switch a power mode of the client device.

The database 108 can include digital information relating to a client device. That is, the database 108 can be utilized to store digital information relating to the client device. For example, the database 108 can include country code information received from an access point or a number of access points.

FIG. 2 illustrates a diagram of an example computing device 210 consistent with the disclosure. The computing device 210 can include hardware, machine readable instructions on a non-transitory machine readable medium, or a combination thereof, to perform the elements described herein.

The hardware, for example, can include a processing resource 212 and/or a memory resource 216 (e.g., computer-readable medium (CRM), machine readable medium (MRM), database, etc.). A processing resource 212, as used herein, can include any number of processors capable of executing instructions stored by a memory resource 216. Processing resource 212 may be implemented in a single device or distributed across multiple devices. The machine readable instructions (e.g., computer readable instructions (CRI)) can include instructions stored on the memory resource 216 and executable by the processing resource 212 to implement a desired element (e.g., compare a time zone associated with a current location of a client device with a country code associated with a current location of an access point, wherein the client device is connected to the access point, switch a first radio power mode of the client device to a second radio power mode of the client device based on the comparison of the time zone and the country code, etc.).

The memory resource 216 can be in communication with a processing resource 212. A memory resource 216, as used herein, can include any number of memory components capable of storing instructions that can be executed by processing resource 212. Such memory resource 216 can be a non-transitory CRM or MRM. Memory resource 216 may be integrated in a single device or distributed across multiple devices. Further, memory resource 216 may be fully or partially integrated in the same device as processing resource 212 or it may be separate but accessible to that device and processing resource 212. Thus, it is noted that the computing device 210 may be implemented on a participant device, on a server device, on a collection of server devices, and/or a combination of the participant device and the server device.

The memory resource 216 can be in communication with the processing resource 212 via a communication link (e.g., a path) 214. The communication link 214 can be local or remote to a machine (e.g., a computing device) associated with the processing resource 212. Examples of a local communication link 214 can include an electronic bus internal to a machine (e.g., a computing device) where the memory resource 216 is one of volatile, non-volatile, fixed, and/or removable storage medium in communication with the processing resource 212 via the electronic bus.

A number of modules (e.g., determine module 217, receive module 218, switch module 220) can include CRI that when executed by the processing resource 212 can perform functions. For example, the determine module 217 can determine a time zone associated with a location of the client device from an operating system of the client device, the receive module 218 can receive a country code associated with a location of an access point within communication range from the location of the client device, and the switch module 220 can switch a first radio power mode of the client device having a first output power level to a second radio power mode of the client device having a comparatively higher or lower output power level than the first output power level when the time zone and the country code received from the access point are outside of a designated country.

The number of modules (e.g., determine module 217, receive module 218, switch module 220) can be sub-modules of other modules. For example, the receive module 218 and the switch module 220 can be sub-modules and/or contained within the same computing device. In another example, the number of modules (e.g., determine module 217, receive module 218, switch module 220) can comprise individual modules at separate and distinct locations (e.g., CRM, etc.).

Each of the number of modules (e.g., determine module 217, receive module 218, switch module 220) can include instructions that when executed by the processing resource 212 can function as a corresponding engine as described herein. For example, the determine module 217 can include instructions that when executed by the processing resource 212 can function as the comparison engine 104. In another example, the receive module 218 can include instructions that when executed by the processing resource 212 can function as the comparison engine 104. In another example, the switch module 220 can include instructions that when executed by the processing resource 212 can function as the switch engine 106.

Figure 3:
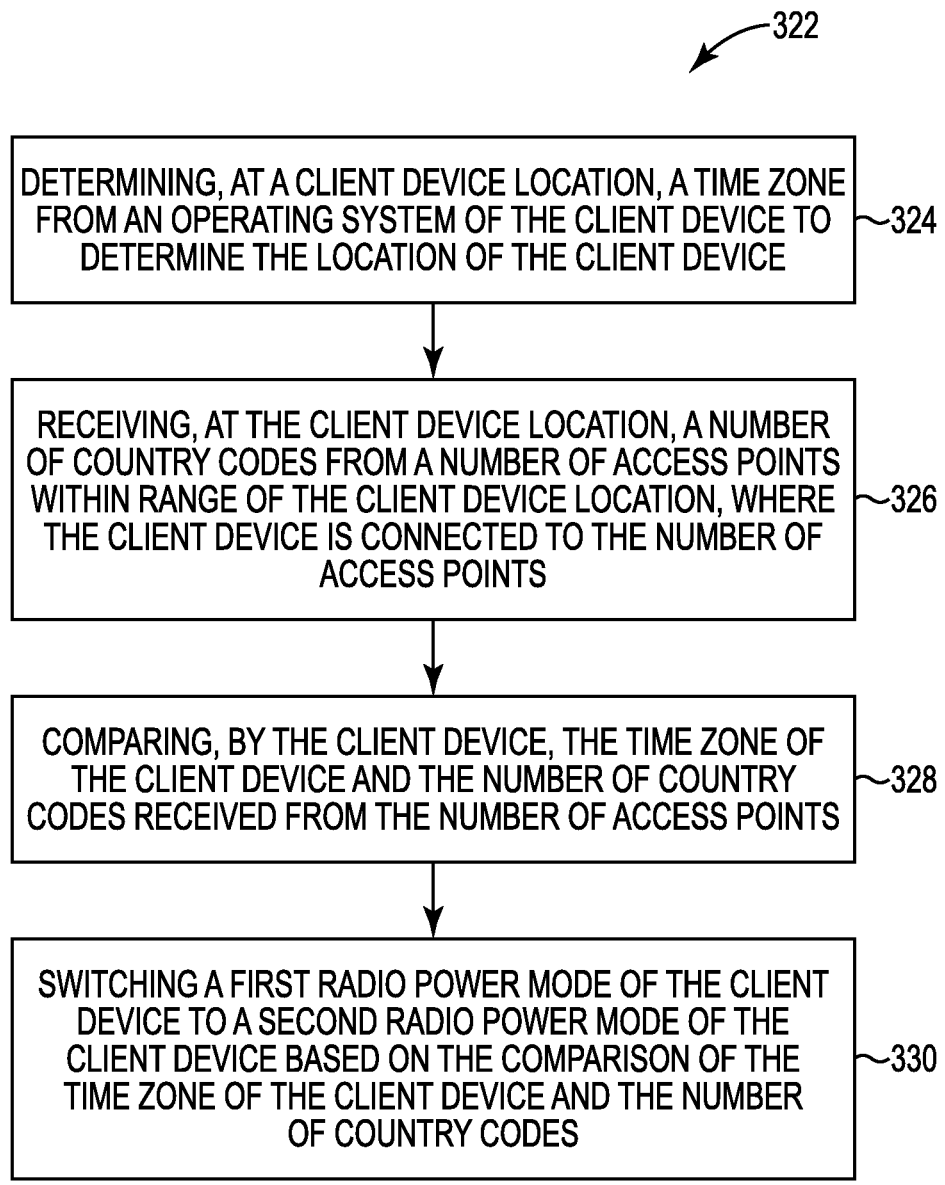
FIG. 3 illustrates a flow chart of a method of radio power switching consistent with the disclosure.

FIG. 3 illustrates a flow chart of a method 322 of radio power switching consistent with the disclosure. For example, method 322 can be performed by a computing device (e.g., computing device 210 previously described in connection with FIG. 2) to switch a radio power mode of a client device.

As illustrated at 324, the method 322 can include determining, at a client device location, a time zone of the client device from an operating system of the client device to determine the location of the client device. The time zone of an operating system of the client device can identify the current location of the client device. That is, the time zone of the client device can refer to a local time zone of the location of the client device. For example, if the client device is located in New York City, N.Y., the local time zone of the client device is the Eastern Time Zone. As another example, if the client device is located in Madrid, Spain, the local time zone of the client device is the Central European Time Zone.

The time zone of the client device can be determined from an operating system of the client device. An operating system of the client device, as used herein, can be software that manages hardware (e.g., processing resource 212, memory resource 216, as previously described in connection with FIG. 2) and software resources and can provide common services for client device programs. The time zone of the client device can be determined by converting the system time of the operating system (e.g., Coordinated Universal Time) of the client device to the local time zone of the location of the client device (e.g., Eastern Time Zone).

In some examples, the time zone of the client device can be set by a manufacturer and/or a wireless service provider of the client device. For example, a manufacturer of a client device to be sold in the United States can set the time zone of the client device to the Eastern Time Zone. As another example, a wireless service provider can set the time zone of a client device included as part of a wireless service agreement to correspond to the coverage area provided by the wireless service provider.

In some examples, the time zone of a client device can be set by a user when powering on the client device. For example, a client device can prompt a user to set the time zone of the client device according to the user's location. The user prompt can occur when the user turns on the client device for a first time. However, examples of the present disclosure are not so limited. For example, the client device can prompt a user to set the time zone of the client device after a set time period, after a number of boot sequences of the client device, and/or after any other action or actionable period of time.

In some examples, the time zone of the client device can be set by determining a geolocation of the client device. For example, the client device can determine a geolocation by using a global positioning system (GPS) of the client device to determine the time zone of the client device.

The location of the client device can determine a radio power mode of the client device. For example, a client device operating in the United States can utilize a radio power mode that is different from a client device operating in Spain. As used herein, a radio power mode of the client device can refer to the transmit power delivered to an antenna of the client device.

The client device, as described herein, can operate in a WLAN channel. For example, the client device can operate in a WLAN channel of a 2.4 GHz frequency band. As used herein, the 2.4 GHz band refers to the frequency band defined by IEEE 802.11 protocols. For example, the client device can operate in channel 12 or channel 13 of the 2.4 GHz band as defined by IEEE 802.11 protocols.

A first radio power mode can be compliant with a designated country's regulated power output values. For example, the United States Federal Communications Commission (FCC) restricts the use of a client device operating in the United States from using channels 12 and 13 in the 2.4 GHz frequency band unless the client device meets certain power output values. In order to use channels 12 or 13 in the 2.4 GHz frequency band in the United States, the client device can utilize a first radio power mode that is compliant with United States FCC regulations (e.g., a maximum effective isotropic radiated power of 36 decibel-Milliwatts (dBm)).

The first radio power mode of the client device can be a default radio power mode. For example, the client device can utilize the first radio power mode as a default radio power mode (e.g., first radio power mode is automatically utilized by the client device) until the client device can switch to a second radio power mode, as will be further described herein.

As illustrated at 326, the method 322 can include receiving, at the client device location, a number of country codes from a number of access points within communication range of the client device location when the client device is connected to the access point. For example, a client device can connect to an access point to receive a country code from the access point when it is within the communication range of the access point.

A country code of the access point can identify a country from which the access point is broadcasting. For example, an access point broadcasting within the United States can use the country code indicating the access point is broadcasting within the United States. As another example, an access point broadcasting within Spain can use the country code indicating the access point is broadcasting within Spain.

In some examples, an access point may not have a country code specified. A client device can consider an access point that that may not have specified a country code as broadcasting within the United States. For example, a client device that receives country code information from an access point that does not specify a country code can consider the access point as broadcasting within the United States.

The client device can receive a number of country codes from a number of access points. For example, a client device can receive two country codes from two respective access points indicating the two access points are broadcasting from Germany. As another example, a client device can receive two country codes from two respective access points indicating one access point is broadcasting from Spain, and another access point is broadcasting from Portugal.

Although described as receiving two country codes from two respective access points, examples of the present disclosure are not so limited. For example, the client device can receive more than two country codes from more than two respective access points. As an additional example, the client device can receive more than three country codes from more than three respective access points. Further, the more than three country codes can be from more than three distinct countries (e.g., one country code from France, one country code from Germany, one country code from Switzerland).

As illustrated at 328, the method 322 can include comparing, by the client device, the time zone of the client device and the number of country codes received from the number of access points. A time zone associated with a current location of a client device can be compared (e.g., by comparison engine 104 or comparison module 218, as previously described in connection with FIGS. 1 and 2, respectively) to a country code associated with a current location of an access point the client device is connected to in order to determine whether the time zone of the current location of the client device and the country code associated with the current location of the access point correspond to each other. For example, a client device with a time zone associated with the Eastern Time Zone can be compared to a country code (e.g., United States) to determine whether the Eastern Time Zone of the client device corresponds to the country code received from the access point.

In some examples, a time zone associated with a current location of a client device can be compared to a number of country codes received from a number of access points. The time zone of the client device and the number of country codes of the number of client devices can be compared to determine whether the time zone associated with the current location of the client device and the number of country codes corresponding to the current locations of the number of access points correspond to one another.

As illustrated at 330, the method 322 can include switching a first radio power mode of the client device to a second radio power mode of the client device based on the comparison of the time zone of the client device and the number of country codes. The client device can switch (e.g., by switch engine 106 or switch module 220, as previously described in connection with FIGS. 1 and 2, respectively) the first radio power mode to the second radio power mode based on the comparison of the time zone of the client device and the country code associated with an access point received by the client device.

The client device can switch from the first radio power mode to the second radio power mode when the time zone of the client device is outside of a designated country and the country code received from the access point is outside of the designated country. That is, the client device can switch from the first radio power mode to the second radio power mode when the country code received from the access point is outside of the designated country and matches the location of the client device indicated by the time zone of the client device. For example, as previously described in connection with 324, a first radio power mode of a client device can be the default radio power mode that can operate in compliance with United States FCC regulations. When the time zone of the client device and the country code received from the access point are indicated to be outside of the United States, the client device can switch from the default radio power mode (e.g., the first radio power mode) to a second radio power mode that may not operate in compliance with United States FCC regulations.

In some examples, the client device can receive country codes from a number of access points. The client device can switch from the first radio power mode to the second radio power mode when the time zone of the client device is outside of a designated country, and each of the number of country codes from the number of access points is outside of the designated country. That is, the client device can switch from the first radio power mode to the second radio power mode when the time zone of the client device is outside of a designated country, and all of the country codes from the number of access points are outside of the designated country.

For example, a client device can receive four country codes from four access points and switch from a first radio power mode to a second radio power mode when all four country codes from the four access points are outside of the designated country. As another example, a client device can receive six country codes from six access points and switch from a first radio power mode to a second radio power mode when all six country codes from the six access points are outside of the designated country.

In some examples, a client device can receive country codes from less than five access points (e.g., one to four access points). The client device can switch from the first radio power mode to the second radio power mode when the time zone of the client device is outside of a designated country, and the number of access points is less than five and each of the number of country codes received from the number of access points is outside of the designated country. For example, a client device can receive four country codes from four access points. The client device can switch from a first radio power mode to a second radio power mode when all four country codes from the four access points are outside of the designated country.

In some examples, a client device can receive three country codes from three access points. The client device can switch from the first radio power mode to the second radio power mode when all three country codes from the three access points are outside of the designated country.

In some examples, the client device can receive four country codes from four access points but only three of the four country codes from the four access points are outside of the designated country (e.g., three country codes indicate Canada, one country code indicates the United States). The client device may not switch from the first radio power mode to the second radio power mode due to only three of the four country codes indicating operation of their respective access points as broadcasting outside of the United States.

In some examples, a client device can receive country codes from more than four access points and less than eight access points (e.g., five to seven access points). The client device can switch from the first radio power mode to the second radio power mode when the time zone of the client device is outside of the designated country and at least 80 percent of the country codes of the number of access points are outside of the designated country.

For example, a client device can receive five, six, or seven country codes from a respective number of access points. The client device can switch from the first radio power mode to the second radio power mode when at least 80 percent of the country codes (e.g., seven of seven country codes, six of seven country codes, five of six country codes, and/or four of five country codes) from a respective number of access points are outside of the designated country.

In some examples, a client device can receive country codes from six country codes from six access points, but only four of the six country codes (e.g., 67 percent) from the six access points are outside of the designated country (e.g., four country codes indicate Canada, two country codes indicate the United States). The client device may not switch from the first radio power mode to the second radio power mode due to only 67 percent of the country codes indicating operation of their respective access points as broadcasting outside of the United States.

In some examples, a client device can receive country codes from more than seven access points (e.g., eight or more access points). The client device can switch from the first radio power mode to the second radio power mode when the time zone of the client device is outside of the designated country, and the number of access points is more than seven and at least seven of the country codes of the number of access points are outside of the designated country.

For example, a client device can receive ten country codes from ten access points. The client device can switch from a first radio power mode to a second radio power mode when at least seven of the country codes from the ten access points are outside of the designated country.

In some examples, a client device can receive ten country codes from ten access points but only six of the ten country codes from the ten access points are outside of the designated country (e.g., six country codes indicate Canada, four country codes indicate the United States). The client device may not switch from the first radio power mode to the second radio power mode due to only six of seven country codes indicating operation of their respective access points as broadcasting outside of the United States.

In the example including more than seven access points (e.g., eight or more access points), at least seven access points with country codes outside of the designated country can have a signal strength stronger than the remaining number of access points. That is, a client device can receive country codes from the seven access points with signal strength stronger than the remaining access points. For example, if there are ten access points, the client device can receive country codes from the seven access points with the strongest signals.

In some examples, signal strength of an access point can be a received signal strength indicator (RSSI) measurement. As used herein, RSSI can be a relative received signal strength in a wireless environment (e.g., WLAN). For example, an access point having a higher RSSI number will have a stronger signal than a different access point having a lower RSSI number.

Although signal strength of an access point is described as being indicated using an RSSI measurement, examples of the present disclosure are not so limited. For example, the signal strength of an access point can be indicated using any other method for measuring the strength of a wireless signal.

In some examples, a client device may not receive a country code from any access points. The client device may not switch from a first radio power mode to a second radio power mode due to no country codes being available (e.g., the client device is not connected to any access points) to compare against a time zone of the client device. For example, a client device may not switch from a first radio power mode to a second radio power mode when the client device is not connected to any access points.

In some examples, an access point that does not specify a country code can be considered as broadcasting within the United States. For example, a client device can receive country codes from two respective access points. The country code of the first access point can indicate the access point is broadcasting from Canada, but the second access point does not specify a country code. The client device will consider the second access point as broadcasting from the United States since the second access point does not specify a country code. The client device will not switch a first radio power mode of the client device to a second radio power mode of the client device since the number of access points is less than five (e.g., two), but both of the country codes do not indicate both of the access points as being outside of the United States (e.g., one indicates Canada, one does not specify a country code and as such is considered as broadcasting within the United States).

The client device may not switch from a first radio power mode to a second radio power mode when the time zone of the client device is inside of the United States. For example, the time zone of the client device can indicate the device is in the Eastern Time Zone within the United States. The device may not switch from the first radio power mode to the second radio power mode due to the client device being in the Eastern Time Zone within the United States.

The method 322 can be repeated when a radio of the client device is activated. For example, method 322 can be repeated to determine a radio power mode of the client device when the client device is powered on and a radio associated with the client device begins to transmit and/or receive communications. As another example, method 322 can be repeated to determine a radio power mode of the client device when an Airplane Mode of the client device is deactivated and a radio associated with the client device begins to transmit and/or receive communications.

As used herein, "logic" is an alternative or additional processing resource to perform a particular action and/or element described herein. Logic can include hardware. The hardware can include processing resources such as circuitry, which are distinct from machine readable instructions on a machine readable media. Further, as used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed is:

1. A system, comprising:
    a comparison engine to compare a time zone associated with a current location of a client device with a country code associated with a current location of an access point, wherein the client device is connected to the access point; and
    a switch engine to switch a first radio power mode of the client device to a second radio power mode of the client device based on the comparison of the time zone and the country code, wherein the client device is switched from the first radio power mode to the second radio power mode when:
        the time zone of the client device is outside of a designated country; and
        the number of access points is less than five and each one of the number of country codes from the number of access points is outside of the designated country, the number of access points is more than four and less than eight and at least 80 percent of the country codes of the number of access points are outside of the designated country, or the number of access points is more than seven and at least seven of the country codes of the number of access points are outside of the designated country.

2. The system of claim 1, wherein the time zone of an operating system of the client device identifies the current location of the client device.

3. The system of claim 2, wherein the location of the client device determines a radio power mode of the client device.

4. The system of claim 1, wherein the country code of the access point identifies a country from which the access point is broadcasting.

5. The system of claim 1, wherein the client device is switched from the first radio power mode to the second radio power mode when the time zone of the client device is outside of a designated country and the country code received from the access point is outside of the designated country.

6. A method, comprising:
    determining, at a client device location, a time zone of the client device from an operating system of the client device to determine the location of the client device;
    receiving, at the client device location, a number of country codes from a number of access points within range of the client device location, wherein the client device is connected to the number of access points;
    comparing, by the client device, the time zone of the client device and the number of country codes received from the number of access points; and
    switching a first radio power mode of the client device to a second radio power mode of the client device based on the comparison of the time zone of the client device and the number of country codes, wherein the client device is switched from the first radio power mode to the second radio power mode when:
        the time zone of the client device is outside of a designated country; and
        the number of access points is less than five and each one of the number of country codes from the number of access points is outside of the designated country, the number of access points is more than four and less than eight and at least 80 percent of the country codes of the number of access points are outside of the designated country, or the number of access points is more than seven and at least seven of the country codes of the number of access points are outside of the designated country.

7. The method of claim 6, wherein the client device is switched from the first radio power mode to the second radio power mode when:
    the time zone of the client device is outside of a designated country; and
    each one of the number of country codes from the number of access points is outside of the designated country.

8. The method of claim 6, wherein the at least seven access points with country codes outside of the designated country have a signal strength that is stronger than the remaining number of access points.

9. The method of claim 6, wherein the method is repeated when a radio of the client device is activated.

10. A non-transitory computer readable medium storing instructions executable by a processing resource to cause a client device to:
   determine a time zone associated with a location of the client device from an operating system of the client device;
   receive a country code associated with a location of an access point within communication range from of the location of the client device, wherein the client device is connected to the access point; and
   switch a first radio power mode of the client device having a first output power level to a second radio power mode of the client device having a comparatively higher output power level than the first output power level when the time zone is outside of a designated country and the number of access points is less than five and each one of the number of country codes from the number of access points is outside of the designated country, the number of access points is more than four and less than eight and at least 80 percent of the country codes of the number of access points are outside of the designated country, or the number of access points is more than seven and at least seven of the country codes of the number of access points are outside of the designated country.

11. The non-transitory computer readable medium of claim 10, wherein the first radio power mode of the client device is a default radio power mode.

12. The non-transitory computer readable medium of claim 10, wherein the first radio power mode is compliant with the designated country's regulated power output values.

* * * * *